US012743488B2

(12) United States Patent
Guo et al.

(10) Patent No.: US 12,743,488 B2
(45) Date of Patent: Sep. 22, 2026

(54) AUTOMATIC PARTIAL DISCHARGE AND NOISE SIGNALS SEPARATION USING ARITHMETIC CODING IN TIME DOMAIN AND MAGNITUDE DISTRIBUTIONS IN FREQUENCY DOMAIN

(71) Applicant: SPACE PTE. LTD., Singapore (SG)

(72) Inventors: Tian Tian Guo, Singapore (SG); Elissa Yanting Lim, Singapore (SG)

(73) Assignee: SPACE PTE. LTD., Singapore (SG)

(*) Notice: Subject to any disclaimer, the term of this patent is extended or adjusted under 35 U.S.C. 154(b) by 401 days.

(21) Appl. No.: 17/523,299

(22) Filed: Nov. 10, 2021

(65) Prior Publication Data

US 2022/0147777 A1 May 12, 2022

(51) Int. Cl.

*G06F 18/2413* (2023.01)
*G06F 18/2321* (2023.01)
*G06V 10/75* (2022.01)

(52) U.S. Cl.

CPC .... *G06F 18/24137* (2023.01); *G06F 18/2321* (2023.01); *G06V 10/758* (2022.01)

(58) Field of Classification Search

CPC .......... G06F 18/24137; G06F 18/2321; G06V 10/758; G01R 31/1227; G01R 31/12
See application file for complete search history.

(56) References Cited

U.S. PATENT DOCUMENTS

2002/0099280 A1* 7/2002 Huang ............... A61B 5/14551 600/323
2004/0092281 A1* 5/2004 Burchfiel ............. H04B 7/0408 455/448
2008/0112632 A1* 5/2008 Vos ..................... G10L 19/0017 382/248
2013/0275063 A1* 10/2013 Lee ........................ G01R 29/26 702/58

(Continued)

FOREIGN PATENT DOCUMENTS

EP 3588108 A1 * 1/2020 ......... G01R 31/1227
WO 2014147275 A1 9/2014

OTHER PUBLICATIONS

European Search Report for Application No. 21207831.5 dated Mar. 25, 2022.

(Continued)

*Primary Examiner* — Eman A Alkafawi
*Assistant Examiner* — Joseph O Nyamogo
(74) *Attorney, Agent, or Firm* — Cesari and McKenna, LLP; Steven M. Mills

(57) ABSTRACT

This disclosure relates to a system and method for separating partial discharge and noise signals from digital signals. The system comprises a data collecting module configured to recording and translating electromagnetic signals measured from a sensor to digital signals and a data processing module configured to: receive digital signals from the data collecting module; generate a feature from a time domain for each of the digital signals; generate a plurality of features from a (Continued)

frequency domain for each of the digital signals; apply clustering algorithm on the generated features for all the digital signals to identify a plurality of distinct clusters; and display each distinct cluster on a Phase-Resolved Partial Discharge (PRPD) chart.

10 Claims, 10 Drawing Sheets

(56) References Cited

U.S. PATENT DOCUMENTS

2014/0100821 A1* 4/2014 Leonard ............ G06F 18/24137 702/189
2014/0310394 A1* 10/2014 Wood .................... H04L 41/142 709/224
2021/0190839 A1* 6/2021 Lim ..................... G01R 23/165

OTHER PUBLICATIONS

Ardila-Rey et al., “A Partial Discharges Acquisition and Statistical Analysis Software,” IEEE International Instrumentation and Measurement Technology Conference, May 13, 2012, pp. 1670-1675.

* cited by examiner

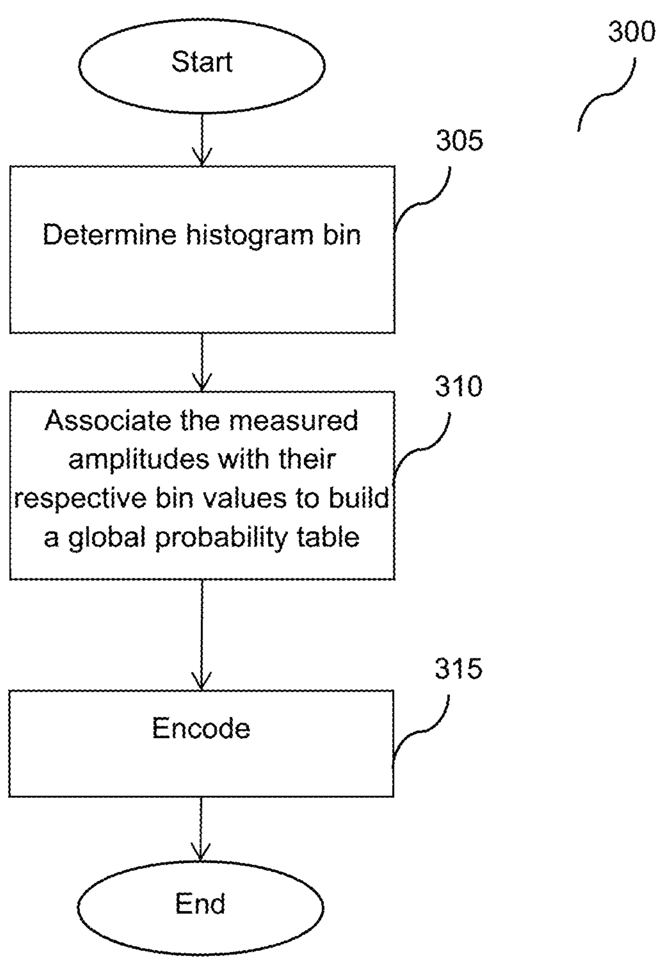
Figure 3.1
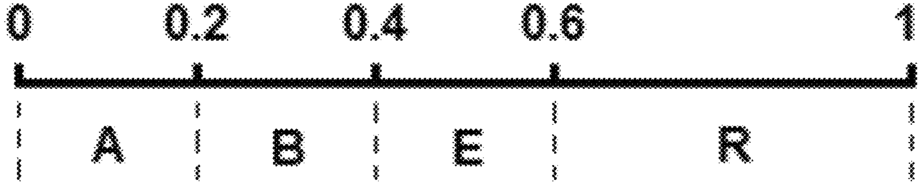
Figure 3.2

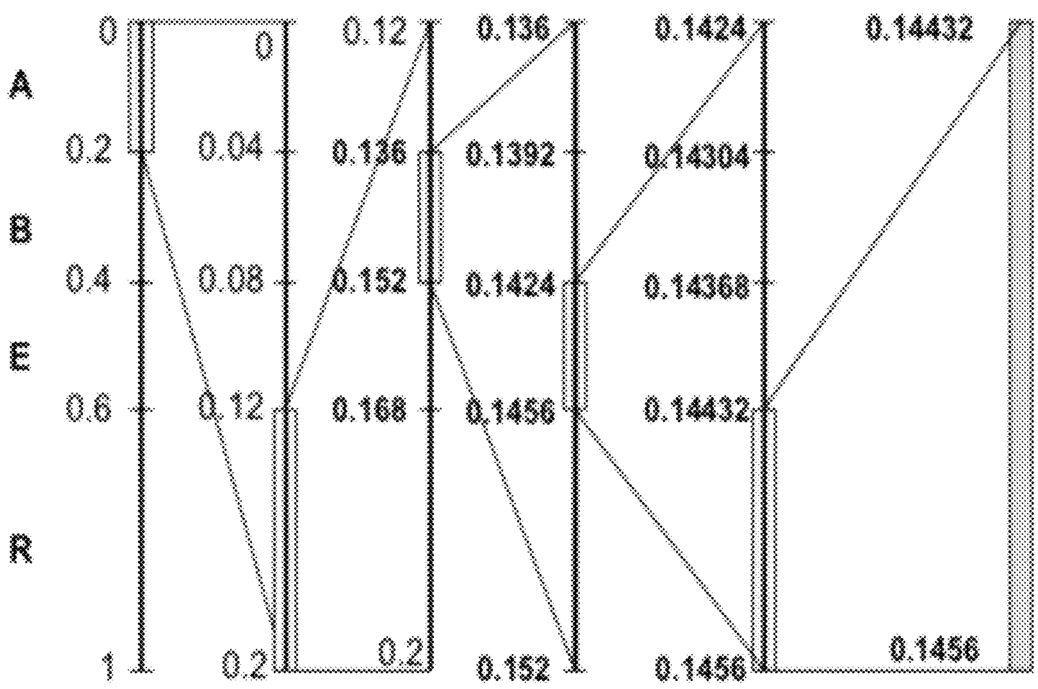
Figure 3.3
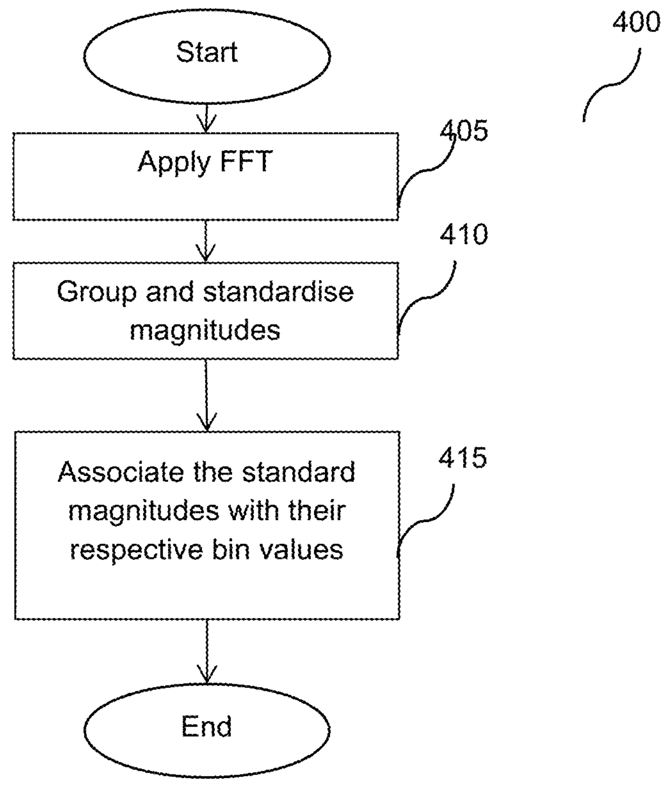
Figure 4

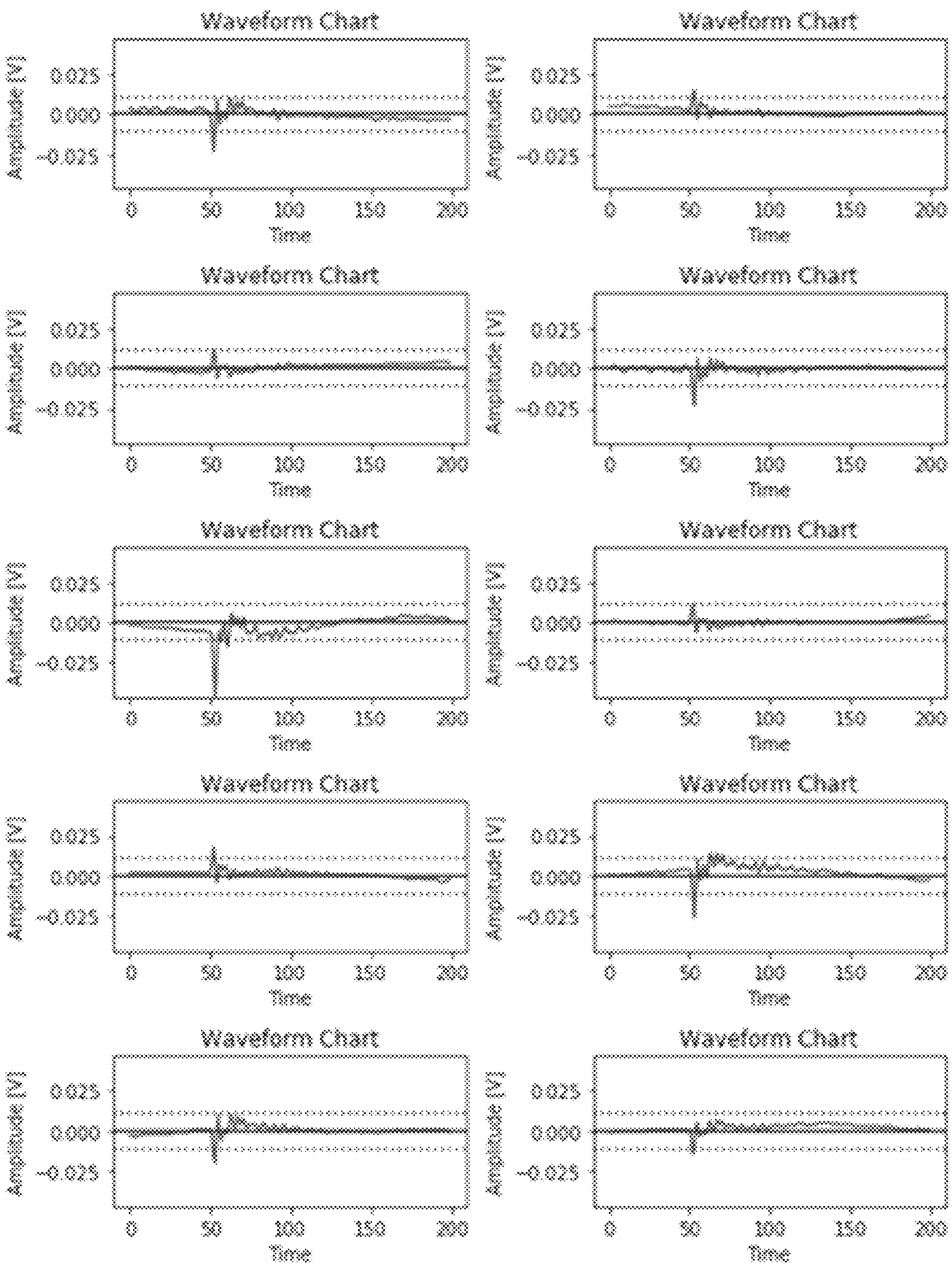
Figure 8.1

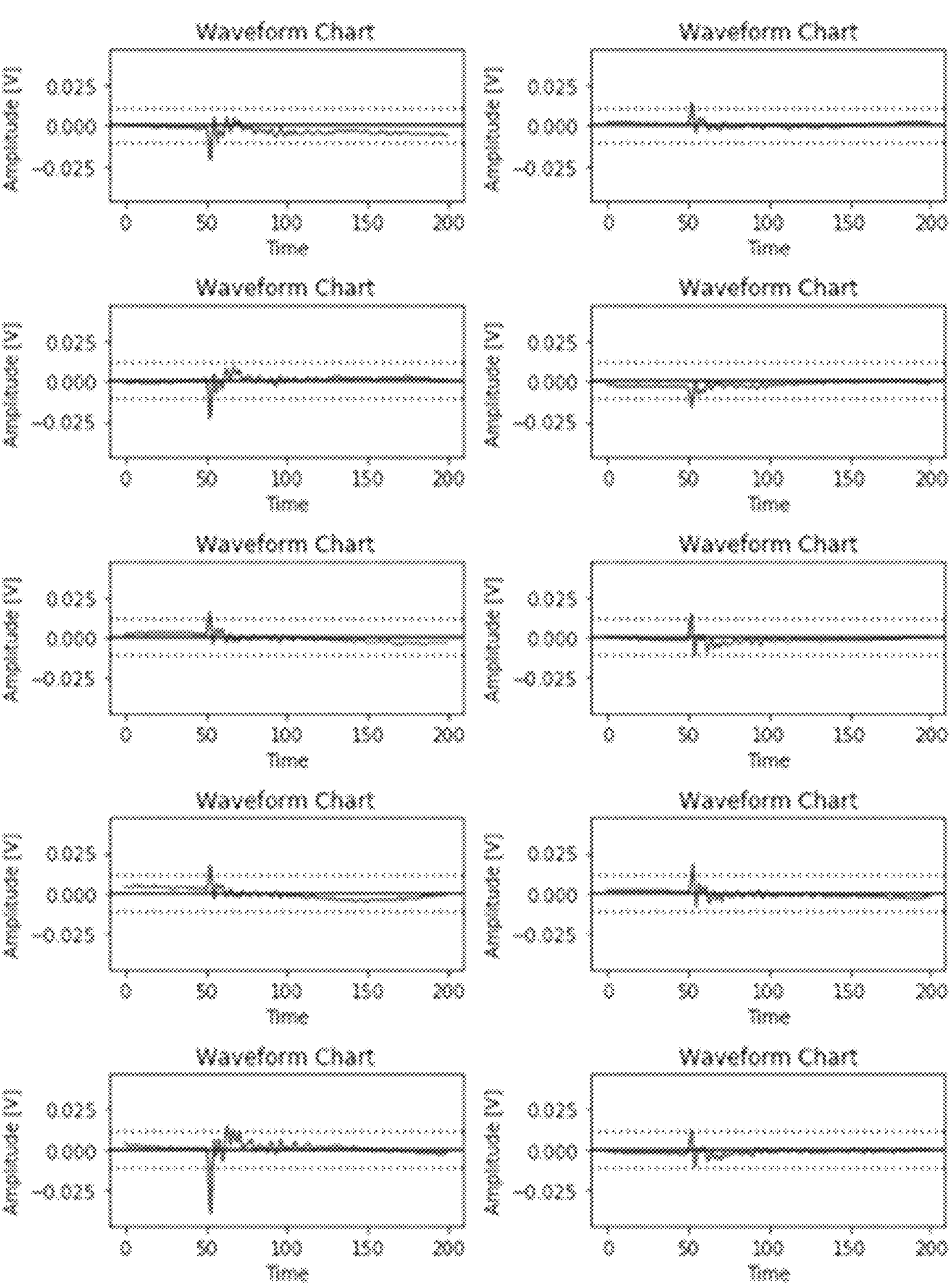
Figure 8.2

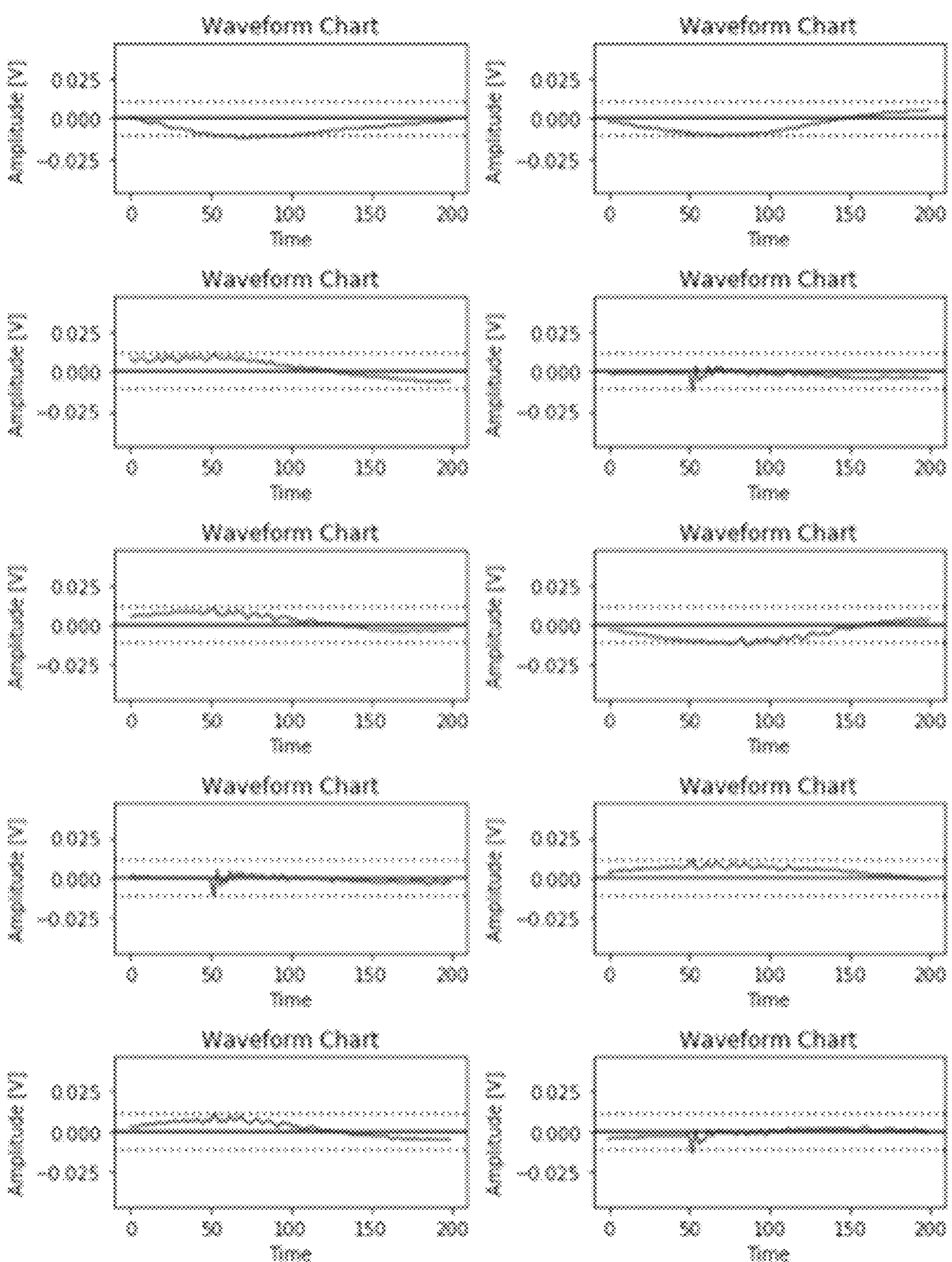
Figure 9.1

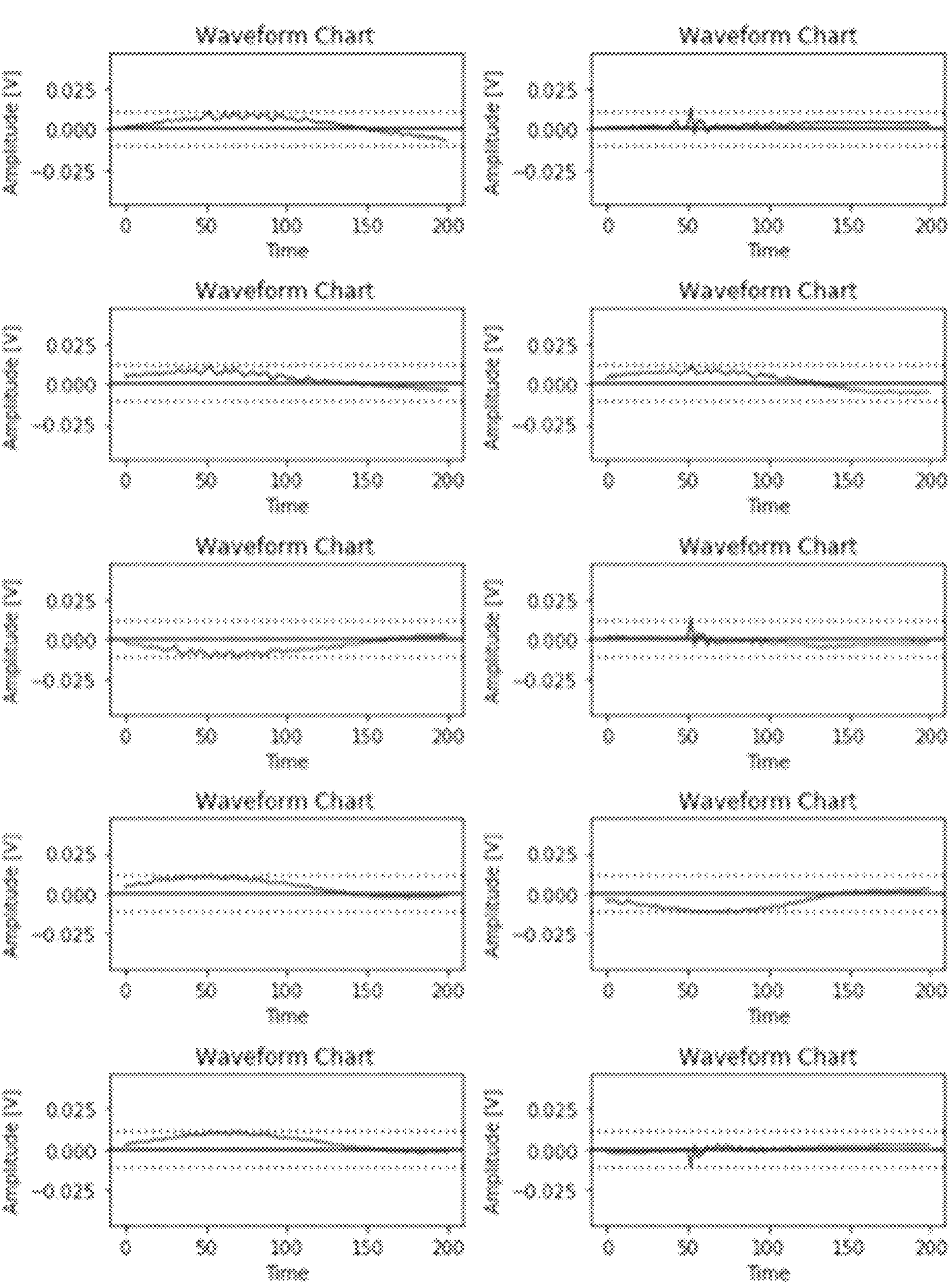
Figure 9.2

AUTOMATIC PARTIAL DISCHARGE AND NOISE SIGNALS SEPARATION USING ARITHMETIC CODING IN TIME DOMAIN AND MAGNITUDE DISTRIBUTIONS IN FREQUENCY DOMAIN

CROSS-REFERENCE TO RELATED APPLICATIONS

This application claims priority to Singapore Patent Application No. 10202011194Y, filed Nov. 11, 2020, entitled AUTOMATIC PARTIAL DISCHARGE AND NOISE SIGNALS SEPARATION USING ARITHMETIC CODING IN TIME DOMAIN AND MAGNITUDE DISTRIBUTIONS IN FREQUENCY DOMAIN, the entire contents of which are incorporated herein by reference for all purposes.

FIELD

This disclosure relates to a system and method for processing partial electrical discharge data, Specifically, this disclosure relates to a system and method of separating partial discharge and noise signal using arithmetic coding in time domain and magnitude distribution in frequency domain.

BACKGROUND

Electrical discharge occurs across a localised area of insulation between 2 conducting electrodes and can severely damage electrical equipment or cause workplace accidents such as death due to arc flash. There are plenty of research papers proposing methods and several industrial solutions e.g. Techimp, Omicron Energy, EA Technology, etc. available to measure Partial Discharge signals. These proposed methods and implemented solutions are largely based on heuristic techniques in Time Domain to engineer statistical features for separation e.g. mean, maximum, minimum and standard deviation of peaks and width, etc.

BRIEF SUMMARY

The above and other problems are solved and an advance in the art is made by a system and method in accordance with this disclosure. A first advantage of the system and method in accordance with this disclosure is that the system and method is able to compress any signal without losing its original waveform information. This increases the separation accuracy between Partial Discharge and Noise signals. A second advantage of the system and method in accordance with this disclosure is that the system and method minimize the impacts and costs of Partial Discharge damaged electrical assets by accurately identifying and taking early corrective and preventive actions on them. A third advantage of the system and method in accordance with this disclosure is that the system and method can be used for any industrial application which separates useful signals from background noises, where waveforms of signals are collected and processed to conduct fault detection and diagnosis e.g. mechanical, thermal, chemical, etc. A fourth advantage of the system and method in accordance with this disclosure is that the system and method can be accessible locally which is integrated in a DAQ unit installed on premise or remotely by calling our Application Programming Interface (API) service running on cloud.

A first aspect of the disclosure describes a method for separating partial discharge and noise signals. The method comprises: receiving digital signals that are converted from waveforms of signals collected from a source; generating a feature from a time domain for each of the digital signals; generating a plurality of features from a frequency domain for each of the digital signals; applying clustering algorithm on the generated features to identify a plurality of distinct clusters; and displaying each distinct cluster on a Phase-Resolved Partial Discharge (PRPD) chart.

In an embodiment of the first aspect of the disclosure, the source is from a data collection module comprising a sensor for measuring a wideband of electromagnetic signals in an environment and an acquisition device for recording and translating the electromagnetic signals measured from the sensor to the digital signals.

In an embodiment of the first aspect of the disclosure, the step of generating the feature from the time domain for each of the digital signals comprises: determining histogram bin width and the number of bins for all measured amplitudes in the digital signals; associating all measured amplitudes with their respective bin values; building a global probability table; and encoding information in the global probability table to generate the feature.

In an embodiment of the first aspect of the disclosure, the histogram bin width and the number of bins are determined via Freedman-Diaconis (FD) rule.

In an embodiment of the first aspect of the disclosure, the step of building the global probability table comprises determining the probability of the measured amplitudes in each bin with respect to the rest of the measured amplitudes to build the global probability table.

In an embodiment of the first aspect of the disclosure, the information in the global probability table is encoded via Arithmetic Coding.

In an embodiment of the first aspect of the disclosure, the step of generating a plurality of features from the frequency domain for each of the digital signals comprises: applying a Fast Fourier Transform (FFT) for each digital signal to transform the digital signal from the Time Domain of N measured amplitudes to the Frequency Domain of $(N/2)+1$ magnitudes; grouping the magnitudes according to respective frequency; standardizing the magnitudes in each frequency to bring the magnitudes into a uniform format; normalizing the standardised magnitudes based on global maximum and global minimum magnitude values; determining histogram bin width and the number of bins for all normalized magnitudes in each frequency; associating all normalised magnitudes with their respective bin values; and scaling magnitudes in each bin are scaled to be between 0 and 1 to generate $(N/2)+1$ features.

A second aspect of the disclosure describes a system for separating partial discharge and noise signals comprising: a data collecting module configured to recording and translating electromagnetic signals measured from a sensor to digital signals; and a data processing module configured to: receive digital signals from the data collecting module; generate a feature from a time domain for each of the digital signals; generate a plurality of features from a frequency domain for each of the digital signals; apply clustering algorithm on the generated features to identify a plurality of distinct clusters; and display each distinct cluster on a Phase-Resolved Partial Discharge (PRPD) chart.

In an embodiment of the second aspect of the disclosure, the data collecting module comprises: a sensor for measuring the electromagnetic signals; and an acquisition device for recording and translating the electromagnetic signals measured from the sensor to the digital signals.

In an embodiment of the second aspect of the disclosure, the data processing module is configured to generate the feature from the time domain for each of the digital signals by: determining histogram bin width and the number of bins for all measured amplitudes in the digital signals; associating all measured amplitudes with their respective bin values; building a global probability table; and encoding information in the global probability table to generate the feature.

In an embodiment of the second aspect of the disclosure, the histogram bin width and the number of bins are determined via Freedman-Diaconis (FD) rule.

In an embodiment of the second aspect of the disclosure, the data processing module is configured to build the global probability table by: determining the probability of the measured amplitudes in each bin with respect to the rest of the measured amplitudes to build the global probability table.

In an embodiment of the second aspect of the disclosure, the information in the global probability table is encoded via Arithmetic Coding.

In an embodiment of the second aspect of the disclosure, the data processing module is configured to generate the plurality of features from the frequency domain for each of the digital signals by: applying a Fast Fourier Transform (FFT) for each digital signal to transform the digital signal from the Time Domain of N measured amplitudes to the Frequency Domain of (N/2)+1 magnitudes; grouping the magnitudes according to respective frequency; standardizing the magnitudes in each frequency to bring the magnitudes into a uniform format; normalizing the standardised magnitudes based on global maximum and global minimum magnitude values; determining histogram bin width and the number of bins for all normalized magnitudes in each frequency; associating all normalised magnitudes with their respective bin values; and scaling magnitudes in each bin are scaled to be between 0 and 1 to generate (N/2)+1 features.

BRIEF DESCRIPTION OF THE DRAWINGS

The above and other features and advantages in accordance with this disclosure are described in the following detailed description and are shown in the following drawings:

FIG. 3.1 illustrating a process flow on the process of extracting a feature in time domain in accordance with an embodiment of this disclosure;

FIG. 3.2 illustrating a process of building a global probability table in accordance with an embodiment of this disclosure;

FIG. 3.3 illustrating a result of the global probability table in accordance with an embodiment of this disclosure;

FIG. 4 illustrating a process flow on the process of extracting a number of features in frequency domain in accordance with an embodiment of this disclosure;

FIG. 8.1 illustrating some examples of the waveforms of the cluster PD signals in FIG. 6;

FIG. 8.2 illustrating some other examples of the waveforms of the cluster PD signals in FIG. 6;

FIG. 9.1 illustrating some examples of the waveforms of the cluster noise signals in FIG. 7; and FIG. 9.2 illustrating some other examples of the waveforms of the cluster noise signals in FIG. 7.

DETAILED DESCRIPTION

This disclosure relates to a system and method for processing partial electrical discharge data, Specifically, this disclosure relates to a system and method of separating partial discharge and noise signal using arithmetic coding in time domain and magnitude distribution in frequency domain.

Figure 1:
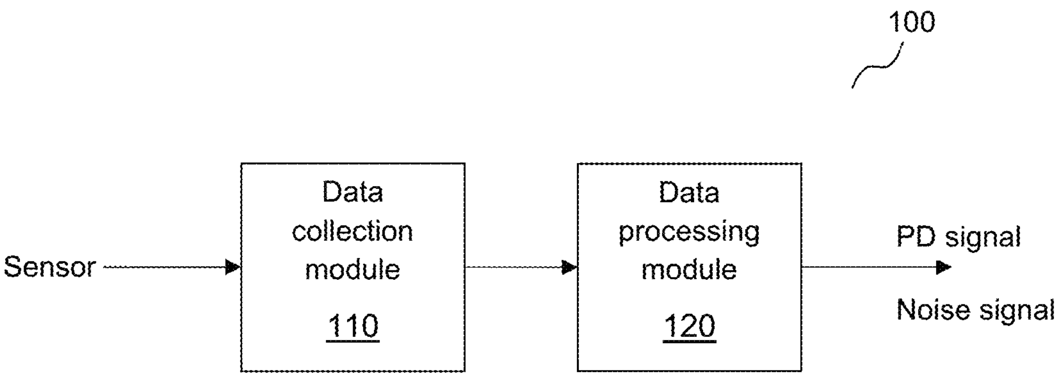
FIG. 1 illustrating a system for separating partial discharge and noise signal from a source in accordance with an embodiment of this disclosure.

FIG. 1 illustrates a system 100 for separating partial discharge and noise signal from a source in accordance with an embodiment of this disclosure. The system 100 comprises a data collection module 110 and a data processing module 120.

Data Collection Module 110

The data collection module 110 is any devices that collects waveforms of signals. In one embodiment, the data collection module 110 comprises a sensor for measuring a wideband of electromagnetic signals in the environment and an acquisition device for recording and translating the electromagnetic signals measured from the sensor to digital signals for the data processing module 120. In an embodiment of this embodiment, the sensor of the data collection module 110 is a High Frequency Current Transformer (HFCT) sensor attached to a switchgear's ground cable to measure a wideband of electromagnetic signals in the environment. The acquisition device of the data collection module 110 is a Data Acquisition (DAQ) device for recording the Phase Angle and converting the analogue signals to digital signals which will be transmitted to the data processing module 120 to further analyse and separate Partial Discharge and Noise signals. The Sampling Rate e.g. S mega samples per second, and number of measured amplitudes per signal e.g. N amplitudes per signal configured in the DAQ device determine the captured signal duration e.g. N/S microseconds per signal. For purposes of this discussion, S is 100 and N is 200.

Essentially, the data collection module 110 is for collecting of various waveforms of signals from a source such as the environment and translating the collected signals to digital signals. The digital signals are then transmitted to the data processing module 120 for further analysis to separate partial discharge signal and noise signal from the collected signals.

Data Processing Module 120

The data processing module 120 processes digital signals received from the collection module 110. Specifically, the digital signals captured by the HFCT sensor in both Time and Frequency Domain are used to derive useful features for separating Partial Discharge and Noise signals.

The data processing module 120 comprises a processing unit for executing the processes in accordance with this disclosure. The processing unit is a typical computing system that comprises a processor, memory and instructions stored on the memory and executable by the processor. The processor may be a processor, microprocessor, microcontroller, application specific integrated circuit, digital signal processor (DSP), programmable logic circuit, or other data processing device that executes instructions to perform the processes in accordance with the present disclosure. The processor has the capability to execute various applications that are stored in the memory. The memory may include read-only memory (ROM), random-access memory (RAM), electrically erasable programmable ROM (EEPROM), flash cards, or any storage medium. Instructions are computing codes, software applications that are stored on the memory and executable by the processor to perform the processes in accordance with this disclosure. Such computing system is well known in the art and hence only briefly described herein. The instructions can developed in C++ language (or any other known programming language) and can be run on System on Chip (SoC) like Raspberry Pi or/and mobile devices like cell phones or tablet PCs.

Figure 2:
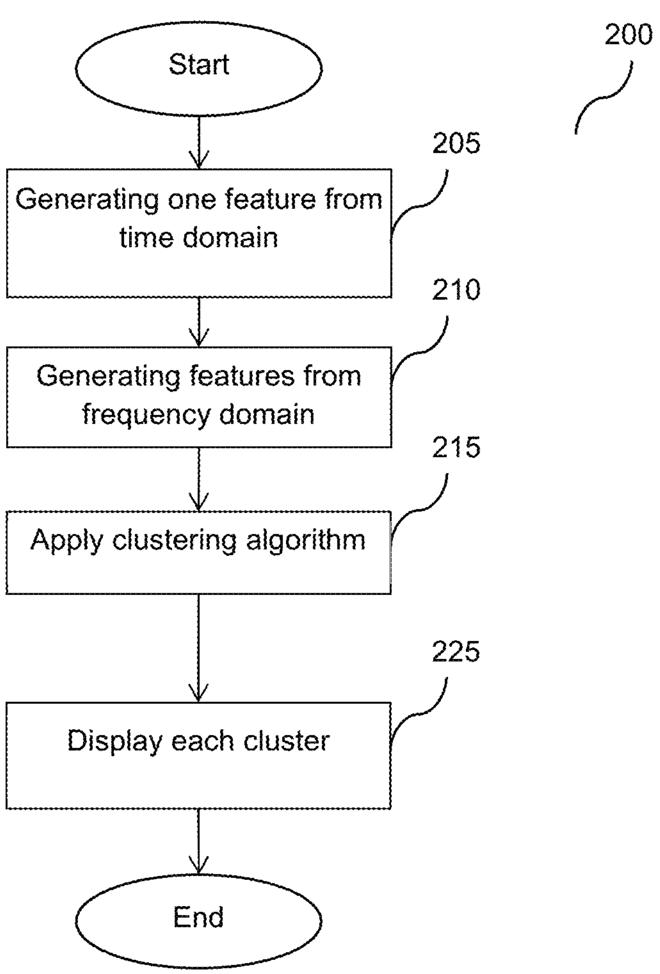
FIG. 2 illustrating a process flow that is executed by a data processing module in FIG. 1 for separating Partial Discharge and Noise signals from digital signals in accordance with an embodiment of this disclosure.

FIG. 2 illustrates a process flow 200 that is executed by the instructions of the processing unit of the data processing module 120 for separating Partial Discharge and Noise signals from the digital signals received from the data collection module 110.

Process 200 begins with step 205 to generate 1 useful feature from the digital signals in time domain for each digital signal. Further details on how the useful feature is being generated from the digital signals in time domain will be described below with reference to FIG. 3.

In step 210, process 200 generates a number of useful features from the digital signals in frequency domain for each digital signal. Further details on how the useful features are being generated from the digital signals in frequency domain will be described below with reference to FIG. 4. Essentially, the feature generated from amplitudes in the time domain is based on a lossless data compression technique while the features generated from the magnitudes in the frequency domain are based on the distribution of magnitudes in each frequency and the entire frequency range.

After deriving the useful features from the time and frequency domains, process 200 applies a clustering algorithm to form different clusters for the generated features in step 215 to identify distinct groups. Specifically, after deriving the generated features (e.g. N/2+2 features for each digital signal (N/2+1 features from frequency domain and 1 feature from time domain)) for all the digital signals, we apply a K-Means Clustering algorithm with multiple numbers of clusters on the generated features to identify the distinct groups among the generated features. K-means clustering is one of the popular unsupervised machine learning algorithms. K-means clustering aims to partition n observations into k clusters in which each observation belongs to the cluster with the nearest centroid, which is the imaginary or real location representing the centre of the cluster. In other words, the K-means algorithm identifies k number of centroids, and allocates every data point to the nearest cluster, while keeping the centroids as small as possible. K-means Clustering algorithm is a well-known method of identifying distinct groups among a dataset and hence, the exact details are omitted for brevity.

The number of clusters (k) is the most important parameter in K-means clustering. One method of determining the optimal value of k is by the highest Gap Statistic difference value. The Gap Statistic estimates the number of clusters in a set of data. This technique uses the output of any clustering algorithm e.g. K-means, comparing the change in within-cluster dispersion with that expected under an appropriate reference null distribution. The Gap Statistic is used together with the K-Means Clustering algorithm and reiterated a number of times to improve the clustering of the generated features.

Another method of determining the optimal value of k is the Silhouette method. The Silhouette method computes silhouette of each observation that measure how much an observation is similar to its own cluster compared to other clusters. The Silhouette method computes the silhouette coefficients for each observation, and average it out for all the observations to get the silhouette score. The silhouette score is a measure of how similar an object is to its own cluster compared to other clusters. The value of the silhouette ranges between [1, −1], where a high value indicates that the object is well matched to its own cluster and poorly matched to neighbouring clusters. If most objects have a high value, then the clustering configuration is appropriate. If many points have a low or negative value, then the clustering configuration may have too many or too few clusters. The number of clusters with the best Silhouette Score is shortlisted. Since the Silhouette Score is only applicable for more than 1 cluster, we calculated the Gap Statistic for 1 cluster and the selected number of clusters by the best Silhouette Score. The final number of clusters chosen for the K-Means Clustering algorithm is determined by a higher Gap Statistic.

Figure 5:
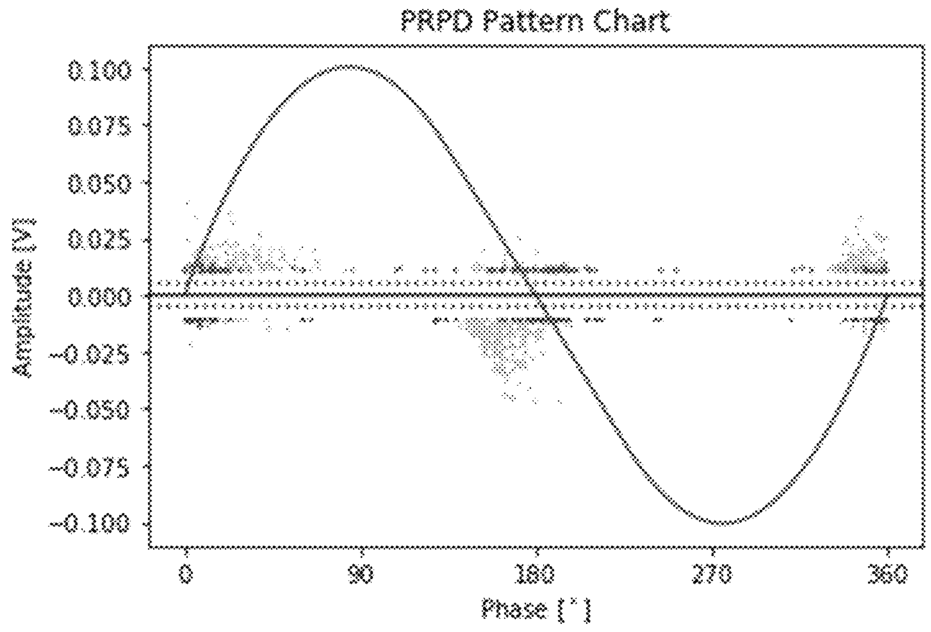
FIG. 5 illustrating an overall Signals PRPD Chart comprising clusters of partial discharge and noise signals.
Figure 6:
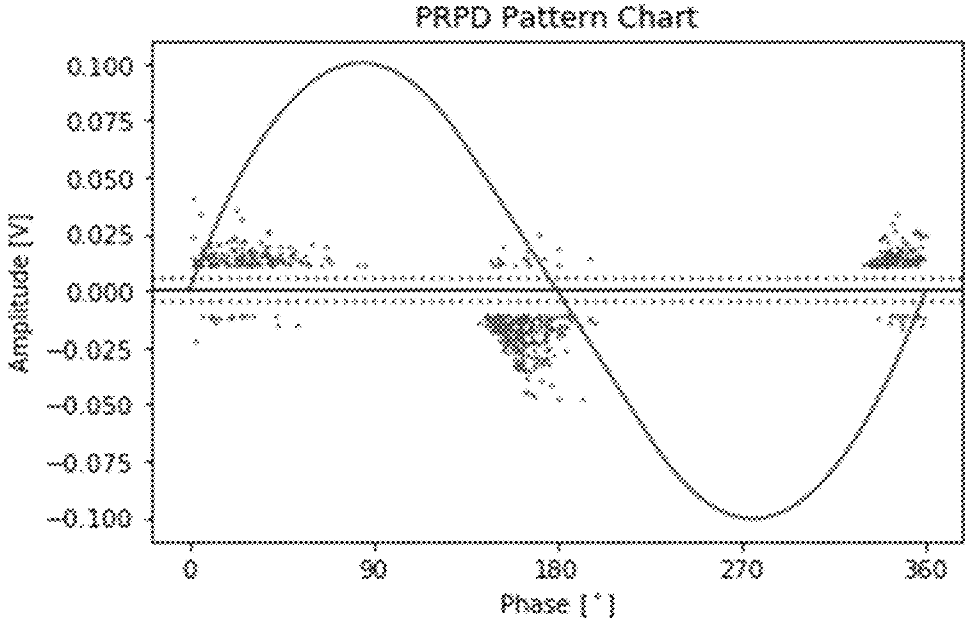
FIG. 6 illustrating the clusters of partial discharge signal of the overall Signals PRPD Chart of FIG. 5.
Figure 7:
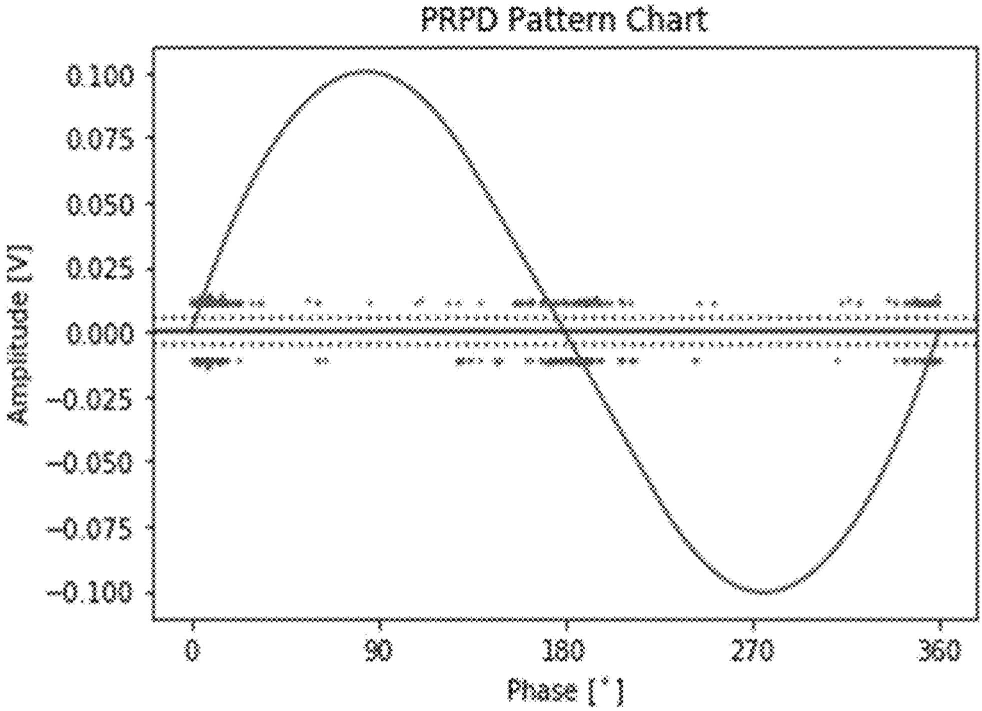
FIG. 7 illustrating the clusters of noise signal of the overall Signals PRPD Chart of FIG. 5.

In step 225, process 200 displays each of the clusters. Specifically, for each cluster of signals, we visualized them on a Phase-Resolved Partial Discharge (PRPD) chart. A PRPD pattern is a visual representation of a partial discharge activity relative to the 360 degree of an AC cycle. The PRPD plot shows the amplitude of each discharge event (y-axis) plotted against their phase angle (x-axis) FIG. 5 illustrates an overall Signals PRPD Chart comprising two clusters including partial discharge cluster and noise signals cluster. FIG. 6 illustrates the partial discharge cluster in the PRPD Chart of FIG. 5. FIG. 7 illustrates the noise signal cluster in the PRPD Chart of FIG. 5. FIGS. 8.1 and 8.2 illustrate some examples of the waveforms of the cluster PD signals in FIG. 6. FIG. 8.1 indicates that there are 1050 signals in total and 450 signals of these 1050 signals belong to cluster 0. FIGS. 9.1 and 9.2 illustrate some examples of the waveforms of the cluster noise signals in FIG. 7. FIG. 9.1 indicates that there are 1050 signals in total and 600 signals of these 1050 signals belong to cluster 1. FIGS. 5-9.2 illustrate a set of generated features with 2 clusters identified by the K-Means Clustering algorithm. One skilled in the art will recognise that the number of clusters are dependent on the digital signals received and more than 2 clusters may be identified by the processes of this disclosure without departing from the disclosure.

FIG. 3 illustrates a process flow 300 on the process of generating 1 useful feature from the amplitudes in time domain for each digital signal. Process 300 begins with step 305 in determining optimal histogram bins for all measured amplitudes in the digital signals. The amplitudes are analogue values converted from digitized signals. Assuming there are 1000 digital signals with N amplitudes per digital signal, the total number of amplitudes is 1000 N. In order to determine the optimal histogram bins, an estimator based on Freedman-Diaconis (FD) rule is applied to determine the optimal histogram bins for all measured amplitudes. In statistics, the Freedman-Diaconis (FD) rule can be used to select the width of the bins to be used in a histogram. The general equation for the FD rule is:

$$\text{Bin width} = 2\frac{IQR(x)}{\sqrt[3]{n}}$$

where IQR(x) is the interquartile range of the dataset between the largest and smallest values from the middle 50% of the dataset and n is the number of observations in the sample x. In this example, dataset refers to the total number of amplitudes. In short, the FD estimator is used for determining the bin width of the dataset. Once the bin width is determined, we would be able to determine the number of bins for the dataset, i.e. number of bins=(maximum amplitude−minimum amplitude)/bin width.

In step 310, process 300 associates all measured amplitudes with their respective bin values which were determined by the estimator and subsequently build a global probability table for Arithmetic Coding in step 315. Global probability table is the probability of each value appearing in the respective bin. In this step, instead of using all 1000 N measured amplitudes, we will use the measured amplitudes in respective bin values to build the global probability table. Specifically, the measured amplitudes are grouped in respective bin. The probability of the measured amplitudes in each bin is determined with respect to the rest of the 1000 N measured amplitudes to build the Global probability table. The global probability table can be illustrated using the following example: "ARBER".

(1) Determine probability p for each character (ch) based on occurrence

| Symbol | Times | P |
|---|---|---|
| A | 1 | 0.2 |
| B | 1 | 0.2 |
| E | 1 | 0.2 |
| R | 2 | 0.4 |

(2) Divide (0,1) into subsections, sort and associate each section to a ch of probability p as shown in FIG. 3.2.
(3) Initial section is [0,1), set l=0, h=1
(4) For each input ch, find the section ch belongs to [L, H), update:

$$l=l+(h-l)*L$$

$$h=l+(h-l)*H$$

Therefore, we can derive the global probability table as follows and also shown in FIG. 3.3.

| | |
|---|---|
| A in [0, 0.2), L = 0, H = 0.2 | l = l + (h − l)*L = 0<br>h = l + (h − l)*H = 0.2 |
| R in [0.6, 1), L = 0.6, H = 1 | l = l + (h − l)*L = 0.12<br>h = l + (h − l)*H = 0.2 |
| B in [0.2, 0.4), L = 0.2, H = 0.4 | l = l + (h − l)*L = 0.136<br>h = l + (h − l)*H = 0.152 |
| E in [0.4, 0.6), L = 0.4, H = 0.6 | l = l + (h − l)*L = 0.1424<br>h = l + (h − l)*H = 0.1456 |
| R in [0.6, 1), L = 0.6, H = 1 | l = l + (h − l)*L = 0.14432<br>h = l + (h − l)*H = 0.1456 |

In step 315, process 300 encodes, using Arithmetic Coding, the information in the global probability table built in step 310 to a unique fractional value between 0 and 1 to generate the feature. Arithmetic Coding is a form of entropy encoding used in lossless data compression. For example, normally, a string of characters is represented using a fixed number of bits per character, as in the ASCII code. When a string is converted to arithmetic encoding, frequently used characters will be stored with fewer bits and not-so-frequently occurring characters will be stored with more bits, resulting in fewer bits used in total.

Process 300 can also be illustrated using the following example in Time Domain.

Assume input: N signals (e.g. 1000 signals) and each signal has the same duration (e.g. 2 us) and sampled by M (e.g. 200 sampled points), which can be denoted by $X_{ij}$, i∈[0,N), j∈[0,M). The Output would be: $t_i$ when the input is applied to the following algorithm.

1. Freedman-Diaconis (FD) estimator determines the optimal histogram bins for all measured amplitudes (e.g. 200 k amplitudes)
2. All measured amplitudes are associated with their respective bin values (obtained via the FD estimator) to build a global probability table.
3. For each signal, apply Arithmetic Coding to encode the associated signal information in the global probability table from Step 2 to a unique fractional value between 0 and 1.

FIG. 4 illustrates a process flow 400 on the process of extracting a number of useful features in frequency domain. The number of useful features that can be extracted from the frequency domain is dependent on the number of measured amplitudes per signal. Specifically, number of useful features can be expressed with the following expression: N/2+1 features from each digital signal.

Process 400 begins with step 405 by applying Fast Fourier Transform (FFT) for each digital signal to transform the digital signal from the Time Domain of N measured amplitudes to the Frequency Domain of (N/2)+1 derived magnitudes for Sampling Rate of S mega samples per second. From the 1000 digital signals, there is a total of 1000((N/2)+1) magnitudes. As mentioned above, the Sampling Rate of S mega samples per second and number of measured amplitudes per signal (N amplitudes per signal) configured in the DAQ device determine the captured signal duration e.g. N/S microseconds per signal. For purposes of this discussion, S is 100 and N is 200. Hence, there are 101,000 magnitudes.

In step 410, the 1000(N/2+1) magnitudes are grouped according to its own frequency. The magnitudes in each grouped are then standardized to bring the magnitudes into a uniform format. Thereafter, process normalizes the 1000 (N/2+1) standardised magnitudes based on global maximum and global minimum magnitude values. Step 410 essentially groups all the magnitudes according to respective frequency and standardise the magnitudes in each frequency before normalising all the magnitudes based on global maximum and global minimum magnitude values.

In step 410, process 400 uses the estimator to determine the optimal histogram bins for the 1000(N/2+1) normalised magnitudes in each frequency. Specifically, process 400 uses the Freedman-Diaconis (FD) estimator to determine the optimal histogram bins for the normalised magnitudes in each frequency. As mentioned above, the Freedman-Diaconis (FD) rule can be used to select the width of the bins to be used in a histogram. The general equation for the FD rule is:

$$\text{Bin width} = 2\frac{IQR(x)}{\sqrt[3]{n}}$$

where IQR(x) is the interquartile range of the dataset between the global maximum value and global minimum value from the middle 50% of the dataset and n is the number of observations in the sample x. In this example, dataset refers to the total number of normalised magnitudes, 1000(N/2+1). In short, the FD estimator is used for determining the bin width of the dataset. Once the bin width is determined, we would be able to determine the number of bins for the dataset, i.e. number of bins=(maximum magnitude−minimum magnitude)/bin width.

In step 415, process 400 associates all normalised magnitudes with their respective bin values. In this step, instead of using the N/2+1 standardized magnitudes, we will use the 1000((N/2)+1) normalised magnitudes to group them in the respective bin values. The bin values are then scaled to be between 0 and 1. Specifically, the magnitudes in each bin are scaled to be between 0 and 1 to generate N/2+1 features for each digital signal. Process 400 ends after step 415.

In the Time Domain, process 300 uses lossless data compression techniques to preserve the original waveform information as a feature instead of using heuristic techniques to engineer statistical features based on the measured amplitudes in the digital signals. In the Frequency Domain, process 400 considers individual frequency components as features instead of representing a signal with an entropy value. In other words, process 400 simply distributes and standardises the magnitudes in each frequency before redistributing the magnitudes in the respective bin values which is determined by the FD estimator.

Statistical features in Time Domain are abstractions of signals for separation. These features do not capture the temporal evolution of a waveform, which can result in inaccurate signals separation. The use of an entropy value for separation can mask the importance of higher frequency bands' magnitudes, which can also result in inaccurate signals separation.

The above is a description of exemplary embodiments of a system and method in accordance with this disclosure. It is foreseeable that those skilled in the art can and will design alternative system and method based on this disclosure.

The invention claimed is:

1. A method for separating partial discharge and noise signals, the method comprises:

receiving digital signals that are converted from waveforms of signals collected from a source;

generating, using at least one processor, a feature from amplitudes in a time domain for each of the digital signals, wherein the step of generating the feature from the time domain for each of the digital signals comprises:

determining histogram bin width and the number of bins for all measured amplitudes in the digital signals, wherein the histogram bin width and the number of bins are determined via Freedman-Diaconis (FD) rule;

associating all measured amplitudes with their respective bin values;

building a global probability table; and encoding information in the global probability table to generate the feature;

generating, using the at least one processor, a plurality of features from a frequency domain for each of the digital signals, wherein the plurality of features from the frequency domain are dependent on a number of measured amplitudes per digital signal;

applying, using the at least one processor, clustering algorithm on the generated features for all the digital signals to identify a plurality of distinct clusters;

displaying, using the at least one processor, each distinct cluster on a Phase-Resolved Partial Discharge (PRPD) chart, wherein at least one axis of the PRPD chart represents a voltage amplitude of each digital signal in the plurality of clusters; and separating, using the at least one processor and the distinct clusters, the partial discharge and noise signals from the digital signals.

2. The method according to claim 1 wherein the source is data collection module comprising a sensor for measuring a wideband of electromagnetic signals in an environment and an acquisition device for recording and translating the electromagnetic signals measured from the sensor to the digital signals.

3. The method according to claim 1 wherein the step of building the global probability table comprises:

determining the probability of the measured amplitudes in each bin with respect to the rest of the measured amplitudes to build the global probability table.

4. The method according to claim 3 wherein the information in the global probability table is encoded via Arithmetic Coding.

5. The method according to claim 4 wherein the step of generating a plurality of features from the frequency domain for each of the digital signals comprises:

applying a Fast Fourier Transform (FFT) for each digital signal to transform the digital signal from the Time Domain of N measured amplitudes to the Frequency Domain of (N/2)+1 magnitudes;

grouping the magnitudes according to respective frequency;

standardizing the magnitudes in each frequency to bring the magnitudes into a uniform format;

normalizing the standardized magnitudes based on global maximum and global minimum magnitude values;

determining histogram bin width and the number of bins for all normalized magnitudes in each frequency;

associating all normalized magnitudes with their respective bin values; and scaling magnitudes in each bin are scaled to be between 0 and 1 to generate (N/2)+1 features.

6. A system for separating partial discharge and noise signals comprising:

a data collecting module configured to recording and translating electromagnetic signals measured from a sensor to digital signals; and a data processing module comprising one or more computing processors executing instructions, wherein the instructions are configured to:

receive digital signals from the data collecting module;

generate a feature from amplitudes in a time domain for each of the digital signals, wherein generating the feature from the time domain for each of the digital signals comprises:

determining histogram bin width and the number of bins for all measured amplitudes in the digital signals, wherein the histogram bin width and the number of bins are determined via Freedman-Diaconis (FD) rule;

associating all measured amplitudes with their respective bin values;

building a global probability table; and encoding information in the global probability table to generate the feature;

generate a plurality of features from a frequency domain for each of the digital signals, wherein the plurality of features from the frequency domain are dependent on a number of measured amplitudes per digital signal;

apply clustering algorithm on the generated features for all the digital signals to identify a plurality of distinct clusters;

display each distinct cluster on a Phase-Resolved Partial Discharge (PRPD) chart, wherein at least one axis of the PRPD chart represents a voltage amplitude of each digital signal in the plurality of clusters; and separate, using the distinct clusters, the partial discharge and noise signals from the digital signals.

7. The system according to claim 6 wherein the data collecting module comprises:

a sensor for measuring the electromagnetic signals; and an acquisition device for recording and translating the electromagnetic signals measured from the sensor to the digital signals.

8. The system according to claim 6 wherein the data processing module is configured to build the global probability table by:

determining the probability of the measured amplitudes in each bin with respect to the rest of the measured amplitudes to build the global probability table.

9. The system according to claim 8 wherein the information in the global probability table is encoded via Arithmetic Coding.

10. The system according to claim 9 wherein the data processing module is configured to generate the plurality of features from the frequency domain for each of the digital signals by:

applying a Fast Fourier Transform (FFT) for each digital signal to transform the digital signal from the Time Domain of N measured amplitudes to the Frequency Domain of (N/2)+1 magnitudes;

grouping the magnitudes according to respective frequency;

standardizing the magnitudes in each frequency to bring the magnitudes into a uniform format;

normalizing the standardized magnitudes based on global maximum and global minimum magnitude values;

determining histogram bin width and the number of bins for all normalized magnitudes in each frequency;

associating all normalized magnitudes with their respective bin values; and scaling magnitudes in each bin are scaled to be between 0 and 1 to generate (N/2)+1 features.

* * * * *